Aug. 4, 1964          R. A. JEWELL          3,143,057
                   AIR DEFLECTOR TO VEHICLES
Filed May 17, 1962                          2 Sheets-Sheet 1

INVENTOR
Robert A. Jewell
BY Mason, Fenwick & Lawrence
ATTORNEYS

Aug. 4, 1964  R. A. JEWELL  3,143,057
AIR DEFLECTOR TO VEHICLES
Filed May 17, 1962  2 Sheets-Sheet 2

INVENTOR
Robert A. Jewell
BY Mason, Fenwick & Lawrence
ATTORNEYS

United States Patent Office 3,143,057
Patented Aug. 4, 1964

3,143,057
AIR DEFLECTOR TO VEHICLES
Robert A. Jewell, Savannah, Ga., assignor to Great Dane Trailers, Inc., Savannah, Ga., a corporation of Georgia
Filed May 17, 1962, Ser. No. 195,643
3 Claims. (Cl. 98—2)

This invention relates to vehicle bodies, and particularly to improvements in ventilators for such bodies.

Proper ventilation is necessary for trucks, and other such vehicles, carrying produce or other perishable products. Ventilated truck and trailer bodies have been in use for many years. In most instances, ventilation is accomplished by providing ventilating grilles at the front of the vehicle body and a ventilator door at the rear of the vehicle body, the doors being operable when required to allow air to pass through the vehicle body. As a general rule, the ventilator doors at the rear of the vehicle are located in the access doors at the rear.

Recently, a practice has been inaugurated which calls for shipping loaded trailers by rail. The trailers are run upon flat cars, one behind another, with two trailers being loaded on each car. When on the cars, the adjacent ends of the two trailers are quite close, and the air flowing around the trailing end of the forward trailer eddies and creates a burble point just inside the side edge of the leading end of the rear trailer. When the trailers are loaded so that the back end of the rear trailer is facing forwardly, the air supply to the central portions of the leading end of the rear trailer is cut off and no air flows into the ventilator opening. Under these conditions, spoilage of the cargo can occur very quickly.

The general object of the present invention is to provide means at the rear of ventilated trucks, or trailers, to control air movement in the vicinity of the ventilator doors to ensure entry of air in sufficient quantity into the ventilator doors.

A more specific object is the provision of a deflector at the rear of a vehicle body which will be so located as to be at the burble point when the vehicle is the rear one on a railway flat car, to intercept air flowing into the space between the trailer ends to prevent its outflow around the leading corner of the vehicle on which the deflector is mounted and to direct the air toward the ventilator door.

Another object is to provide a deflector which will be hingedly connected to the vehicle for movement to and from a position flush with the vehicle rear door and inclined thereto for operation, with means for yieldably holding the deflector in operative position.

A still more specific object is to provide an air deflector mounted upon a vehicle door which will automatically move to a position flush with the vehicle door when the door is moved to fully open position.

Other objects of the invention will become apparent from the following description of one practical embodiment thereof, when taken in conjunction with the drawings which accompany, and form part of, this specification.

In general, the invention consists in a deflector positioned at the outside of a truck or trailer ventilator door, that is, between the ventilator door and the adjacent vehicle corner, to direct air into the ventilator door opening. The deflector is spring biased to open, or operative, position, and automatically closeable when the vehicle rear door is swung completely open to lie along the vehicle side.

Figure 1:
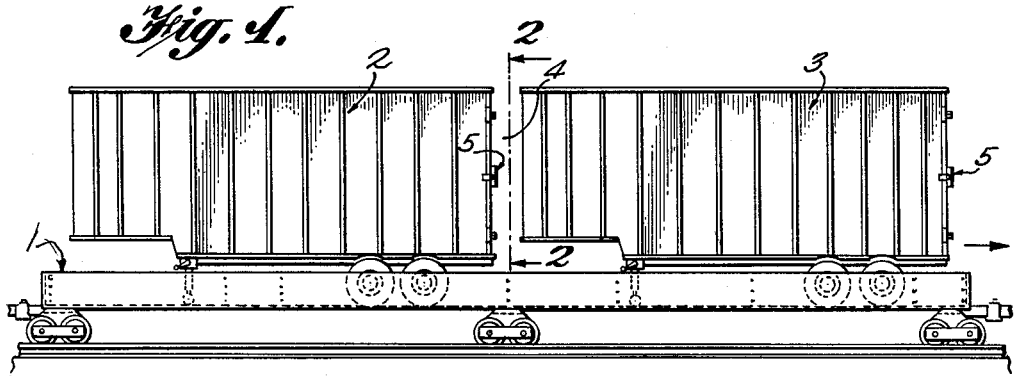
FIGURE 1 is a side elevation of a railway flat car with two trailers loaded in tandem thereon, the trailers being equipped with deflectors in accordance with the principles of the present invention.

Referring to the drawings in detail, and first adverting to FIGURE 1, there is shown a railway flatcar 1 having two trailers 2 and 3 loaded in tandem thereon. As shown, each trailer has its back end facing forward in the direction of car travel, as indicated by the arrow. It is when the vehicles are in this position relative to each other and to the direction of car travel that the ventilator door of the rear vehicle is precluded from receiving a proper supply of air. This is caused by the small space 4 between the vehicles. Air sweeping around the trailing corner of the front vehicle will immediately be drawn outward to move around the leading corner of the rear vehicle. The distance the air moves inward between the vehicles before burbling is very slight. In order to overcome this, and to ensure a supply of air to the ventilator, a deflector 5 is mounted upon the rear of each vehicle, just inside the corner post, to intercept the air stream flowing around the corner of the lead vehicle, and guide it into the ventilator. This will prevent the air in the path of the deflector from flowing outward to move around the leading edge of the trailer carrying the deflector.

Figure 2:
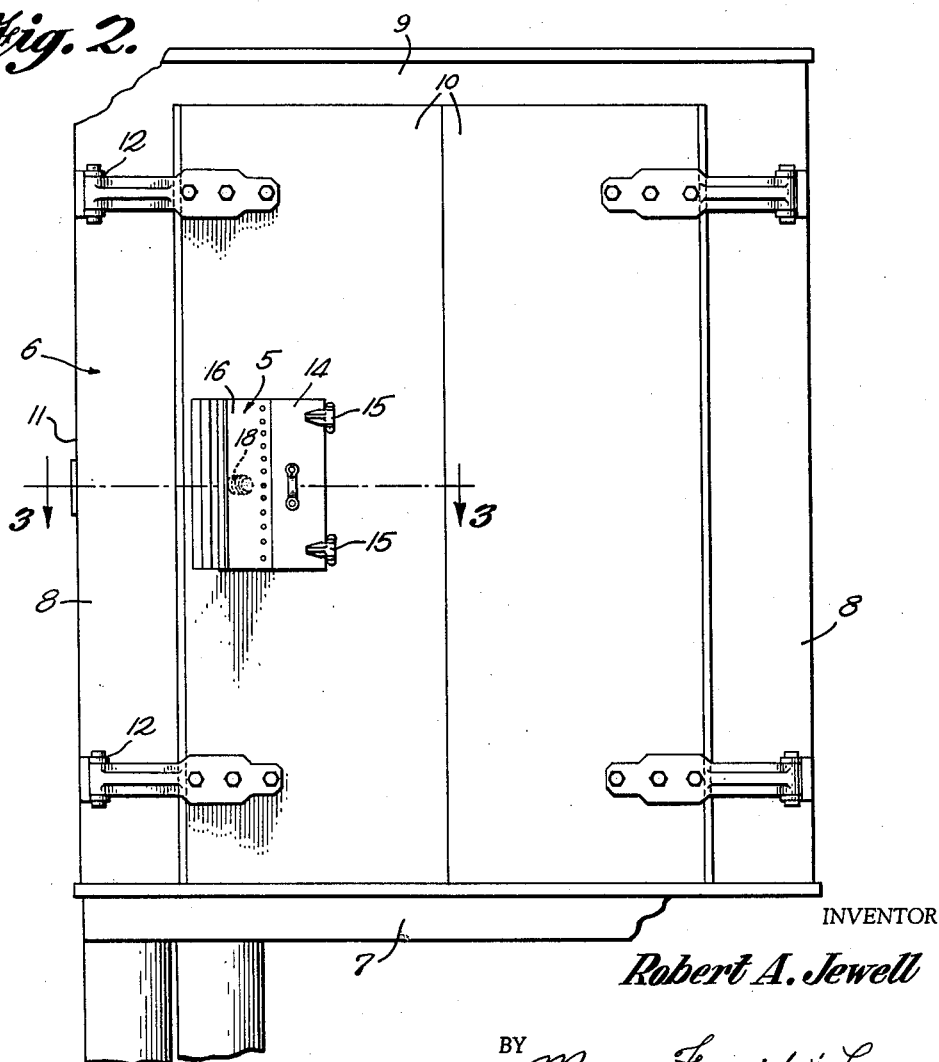
FIGURE 2 is a partial rear elevation of a trailer illustrating the deflector in position adjacent the ventilator door.
Figure 3:
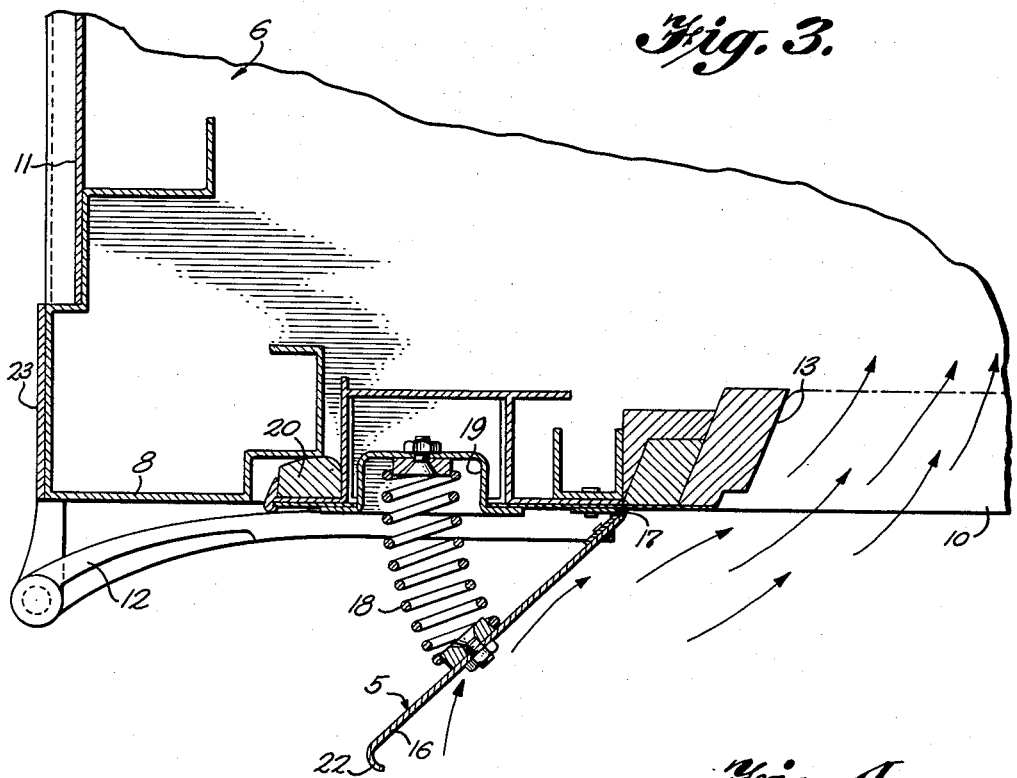
FIGURE 3 is a partial horizontal section, on an enlarged scale, through one rear corner of the trailer body, taken on the line 3—3 of FIGURE 2, the vehicle rear door being shown closed.
Figure 4:
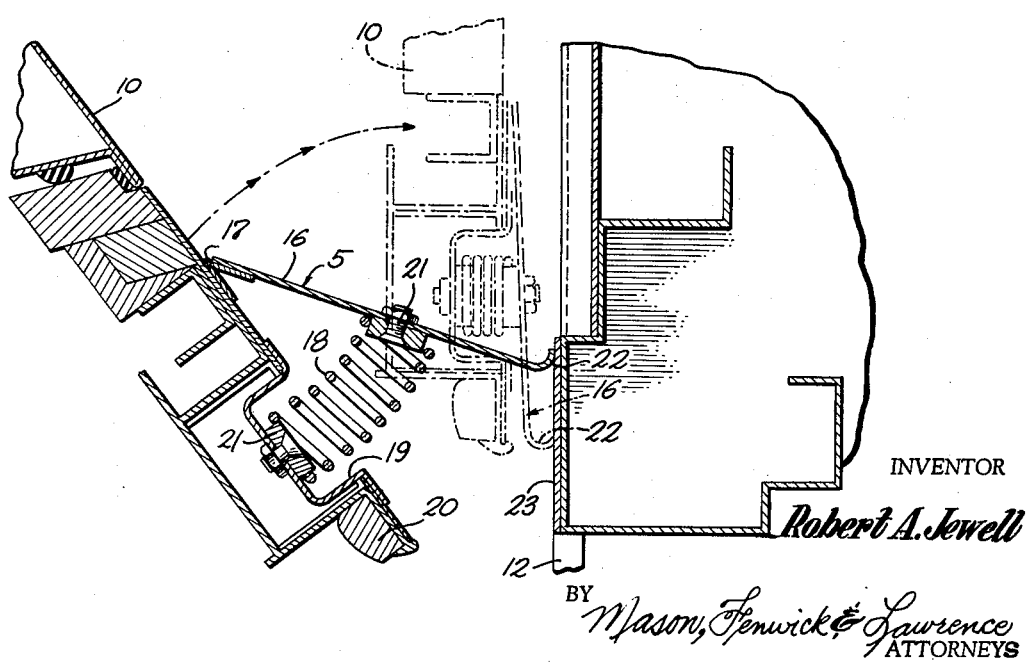
FIGURE 4 is a view similar to FIGURE 3 showing the vehicle door partially opened in full lines, and fully open in dotted lines.

Referring now particularly to FIGURES 2 to 4, inclusive, there is shown a portion of the rear of a trailer body 6, including the vehicle bed 7, rear corner posts 8, top 9, rear access doors 10, and a portion of the vehicle side panel 11. The rear doors are connected to the rear corner posts by hinges 12. The hinges permit the doors to swing from a closed position across the rear of the trailer to a wide open position parallel to the vehicle side, as shown in dotted lines in FIGURE 4. The entire trailer body is of conventional construction and only enough of the associated parts of the body to illustrate the invention have been shown.

As is customary, a ventilator opening 13 is provided in one of the trailer doors, and a ventilator door 14 is hinged, as at 15, to the main door, so that it can be moved to close the opening, or to open it to allow air to pass through. The ventilator door is of conventional construction, and is not illustrated in detail.

Hinged to the trailer rear door adjacent the side edge of the ventilator opening, between the ventilator opening and the adjacent corner post of the body is a deflector 16. The deflector is at the level of the ventilator opening, and is approximately the same height of the opening. With this arrangement, all air moving horizontally and impinging upon the deflector will be directed into the ventilator opening, and a body of air the full height of the opening will be so deflected.

The deflector is secured to the outer wall of the vehicle rear door by a piano hinge 17 which is riveted to the door. The deflector is held yieldingly at the desired angle relative to the rear door by means of a coil spring 18. The spring has one end anchored in cup 19, seated in the rear door frame 20. The opposite end of the spring is anchored to the deflector at a mid-point. The spring ends are fixed by spring anchors 21. The spring is arched from end to end and follows a curve having the pin of hinge 17 as its center, for smooth action of the deflector and proper collapsing of the spring when the deflector is swung toward the rear door surface. The free edge of the deflector is curved transversely of the deflector, as at 22, to provide a smooth outer edge and to supply a rolling cam action against a wear plate 23 when the vehicle rear door is opened to a position parallel to the vehicle sides.

In use, with two vehicles loaded in tandem on a flat car, the rear of one vehicle will be spaced but a short distance from the front of the other. If the car is moved in a direction to make the rear vehicle have its back end facing the direction of travel, the burbling of the air at the sides of the gap between the vehicles, mentioned above, will occur. The position of the deflector 16, however, is such that it will lie in the path of the burbling air and serve to intercept it and prevent it from reversing its direction to flow outward around the leading corner of the rear vehicle. The intercepted air, in a band the height of the deflector, is directed smoothly into the ventilator opening, as shown by the arrows in FIGURE 3. This will ensure an uninterrupted proper supply of ventilating air to the rear vehicle.

During the loading and unloading of the vehicle, the rear doors will be opened. Before the doors are opened, the ventilator door 14 will be closed. It is customary to swing each of the vehicle doors through a 270° arc in opening them, so that it will be completely out of the way and lie parallel to the vehicle side wall, as shown in dotted lines in FIGURE 4. Due to the fact that the deflector is hinged and yieldingly held in its angular position relative to the door, it can collapse to lie flat against the door. This action is automatic, and is accomplished by the curved outer edge of the deflector contacting the wear plate 23 along the corner post and causing the deflector to swing inwardly about its hinge to lie flat against the door. The curved edge 22 of the deflector will roll freely on the wear plate slide smoothly as required to press the deflector inward without breaking it. When the vehicle door is moved away from the vehicle side in swinging to closed position, spring 18 will urge the deflector outward to assume its proper angle. Thus, the deflector will be protected against accidental breakage, and will always assume its proper angle automatically when the vehicle door is closed. It will always be ready for operation when the ventilator door is opened.

While in the above one practical embodiment of the invention has been disclosed, it will be understood that the details of construction shown and described are merely by way of example, and the invention may take other forms within the scope of the appended claims.

What is claimed is:

1. A vehicle having sides and ends adapted for tandem loading with another similar vehicle on a railway flat car with the vehicles in end to end adjacency, wherein the vehicle is of the ventilated type and has at least one door in one end having a ventilator opening therein near the juncture of that end with a side of the vehicle, in combination with an air deflector, the deflector being mounted in the vehicle end door adjacent the ventilator opening between the ventilator opening and the said juncture, the deflector being at such an angle to the door surface as to direct air moving around said juncture to the ventilator opening.

2. A vehicle having a ventilator opening in combination with a deflector as claimed in claim 1 wherein, the deflector is hingedly connected to the door, and a spring is interposed between the deflector and the door to yieldingly hold the deflector at a desired angle relative to the door.

3. A vehicle having a ventilator opening in combination with a deflector as claimed in claim 2 wherein the vehicle door has a recess and the spring is a coil spring having one end seated in the recess in the vehicle door to allow the spring to be compressed into the recess and the deflector to swing flush against the door under pressure.

References Cited in the file of this patent

UNITED STATES PATENTS

| | | |
|---|---|---|
| 830,749 | Taylor | Sept. 11, 1906 |
| 2,338,363 | Strobell | Jan. 4, 1944 |
| 2,557,908 | Cross | June 19, 1951 |
| 2,594,682 | Ritch | Apr. 29, 1952 |
| 2,676,840 | Rothweiler | Apr. 27, 1954 |